United States Patent Office 3,011,129
Patented Nov. 28, 1961

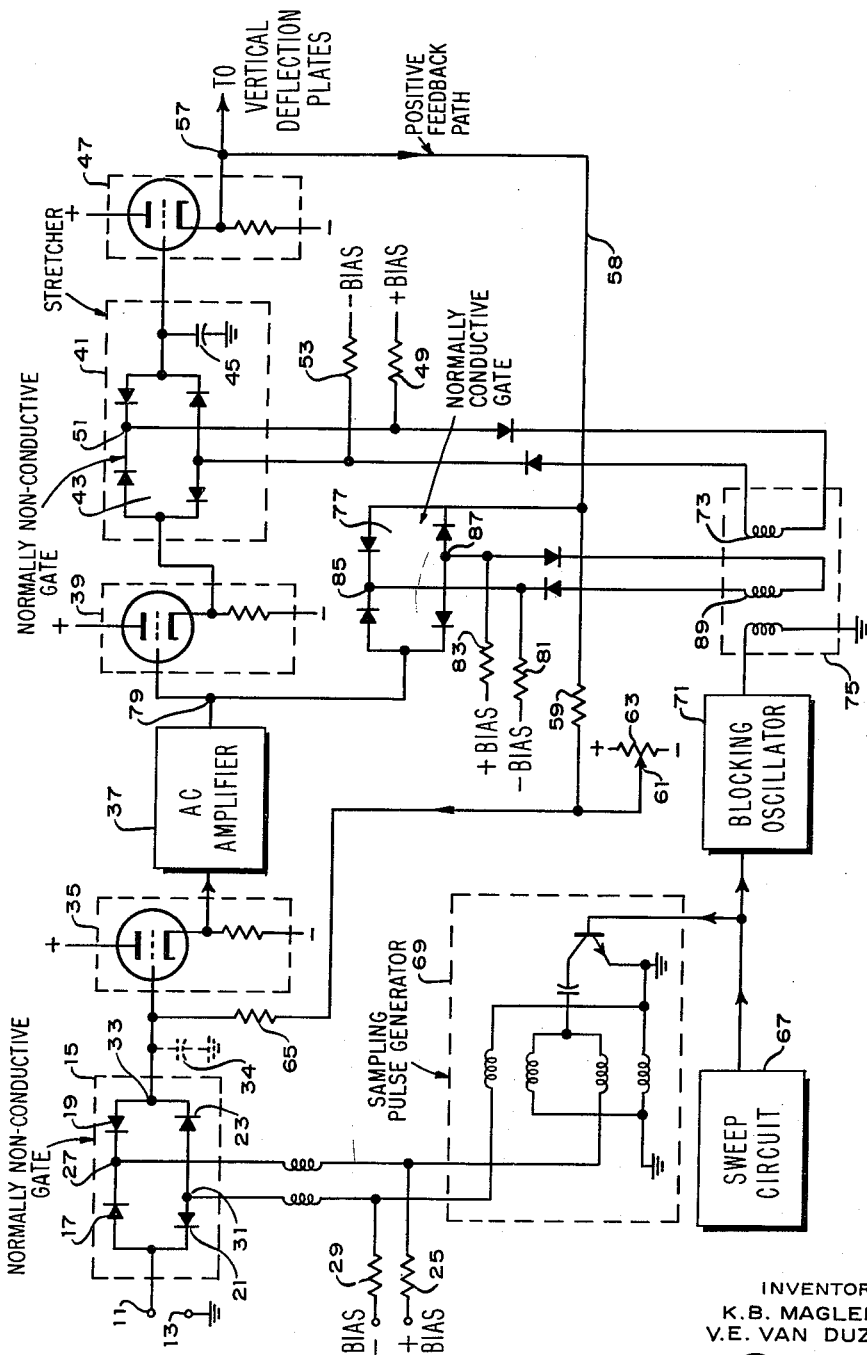

3,011,129
PLURAL SERIES GATE SAMPLING CIRCUIT USING POSITIVE FEEDBACK
Kay B. Magleby, San Jose, and Victor E. Van Duzer, Mountain View, Calif., assignors to Hewlett-Packard Company, Palo Alto, Calif., a corporation of California
Filed Aug. 10, 1959, Ser. No. 832,630
6 Claims. (Cl. 328—151)

This invention relates to sampling oscilloscopes.

Sampling oscilloscopes are used to display recurrent waveforms having high frequency components of the order of several hundred megacycles. The direct display of such waveforms on a conventional oscilloscope is difficult to achieve due to stray capacitances which introduce bandwidth limitations.

In a sampling oscilloscope the complete waveform is not displayed once for each time-base as in conventional oscilloscopes. Instead, a sample measurement is made at a selected point being moved by small time increments along the waveform at each successive recurrence. In this way the shape of the waveform can be traced out as a series of dots or samples on the screen of a cathode-ray tube during the time occupied by a corresponding number of recurring waveforms. Sampling oscilloscope techniques are described in U.S. Patents 2,280,524 and 2,280,531, issued April 21, 1942, to S. Hansen and D. E. Norgaard respectively, and in British Patent 692,615, published June 10, 1953.

A sampling oscilloscope usually comprises a sampling gate to which is applied the waveform under examination. A sampling pulse is applied to the gate to control the times at which the gate is opened to pass elements of the waveform through an amplifier and a stretcher to the vertical deflection plates of the cathode ray tube. The instants at which the sampling pulses are generated are varied cyclically so that the gate opens slightly later during each recurrence of the waveform, and thus a different sample of the waveform is applied to the vertical plates of the cathode ray tube. This time delay may be conveniently obtained by generating a fast linear sweep and a staircase voltage which goes up a step for each recurrence of the sweep. The sampling pulse is generated each time the sweep and the staircase voltages coincide.

The sampling gate is opened for a very short time which may be of the order of a fraction of a millimicrosecond. The gate, which includes a stray capacitance, has a small but finite time constant. When an input signal is applied to the sampling gate, and this gate is opened for a very short time interval, the stray capacitance is charged to a voltage which is less than the input signal due to the time constant of the gate. The ratio of this voltage to the input signal level at the time of sampling is called the sampling efficiency and it is usually less than 1.00. The output signal of the sampling gate is thus less than the input, with consequent distortion of the displayed waveform.

It is the principal object of this invention to provide an improved sampling oscilloscope which is designed to compensate for low sampling efficiency.

In accordance with the illustrated embodiment of this invention, the waveform under examination is applied through a sampling gate to a stretcher, the stretcher comprising another gate and a storage device. Positive feedback means are connected between the output of the stretcher and the output of the sampling gate. Both gates are normally non-conductive. Sampling pulses, derived from the sweep circuit of the oscilloscope, are applied to the sampling gate to render it conductive. Pulses longer than the sampling pulses are applied to the other gate to render it conductive. An amplifier may be provided between the sampling gate and the stretcher, and gated clamping means may be connected between the output of the amplifier and the feedback lead.

Other and incidental objects of this invention will be apparent from a reading of this specification and an inspection of the accompanying drawing.

Referring to the drawing, the waveform under examination is applied to the input terminals 11 and 13 of a sampling gate 15. The sampling gate 15 comprises a first pair of series-connected diodes 17 and 19, and a second pair of series-connected diodes 21 and 23, the two pairs being connected in parallel. The diodes are normally held in a non-conductive state by applying a positive biasing potential through resistor 25 to the junction 27 of diodes 17 and 19, and by applying a negative biasing potential through resistor 29 to the junction 31 of diodes 21 and 23. A very small stray and inter-electrode capacitance 34 is located between terminal 33 and ground. The output terminal 33 of the gate 15 is connected through a first cathode follower stage 35, an A.-C. amplifier 37, and a second cathode follower stage 39 to a stretcher 41. The stretcher 41 comprises a gate 43 and a storage capacitor 45. The output of the stretcher 41 is fed through a cathode follower stage 47 to the vertical deflection plates of the cathode ray tube. The gate 43 is similar to the gate 15 and is held normally closed (i.e. non-conductive) by applying a positive biasing potential through resistor 49 to diode junction 51 and a negative biasing potential through resistor 53 to the diode junction 55. A feedback lead 58 connects the output terminal 57 of the cathode follower stage 47 through resistor 59 to the tap 61 of the potentiometer 63 which controls the vertical position of the beam of the cathode-ray tube, and to the output terminal 33 of gate 15 through resistor 65.

The sampling process is under the control of a sweep circuit 67 which generates suitably timed trigger voltages. The trigger voltage from the sweep circuit 67 is applied to a sampling pulse generator 69 using a transistor operating in the avalanche mode. The sampling pulse generator 69, upon being triggered, generates simultaneously a negative pulse and a positive pulse which are applied to the junctions 27 and 31 respectively. These "sampling" pulses, which are of very short duration (less than one millimicrosecond), overcome the bias on the diodes of gate 15 and open the gate 15 (i.e. render it conductive) for the duration of the sampling pulse.

The trigger voltage from the sweep circuit 67 is also applied to a blocking oscillator 71 which generates an output pulse having a duration of approximately one microsecond and having a leading edge which coincides in time with that of the sampling pulse. This pulse is applied through a winding 73 of transformer 75 to the junctions 51 and 53 of the gate 43 so as to overcome the bias on the diodes of gate 43 and open the gate 43 for the duration of that pulse.

Another gate 77, similar to the gates 15 and 43, is connected between the output terminal 79 of amplifier 37 and the output terminal 57 of the cathode follower stage 47. This gate is kept normally open (i.e. conductive) by applying negative and positive biasing potentials through resistors 81 and 83 to the diode junctions 85 and 87 respectively. The gate 77 is closed, during the intervals when the gate 41 is open, by applying a pulse derived from winding 89 of transformer 75 and applied to the junctions 85 and 87 to gate 77 so as to overcome the biasing potentials on the diodes of gate 77.

The operation of the circuit shown in the drawing is as follows: a trigger voltage from the sweep circuit 67 actuates the sampling pulse generator 69 and the blocking oscillator 71. The sampling pulse generator 69 opens gate 15, and the blocking oscillator 71 opens gate 41 and closes gate 77. The sample of the waveform which is applied to terminals 11 and 13 is passed through the open gate 15, the cathode follower stage 35, the amplifier 37, the cathode follower stage 39 and the open gate 41 to the storage capacitor 45 which holds the sampling information. The voltage on capacitor 45 is applied through the cathode follower stage 47 to the vertical deflection plates of the cathode ray oscilloscope. The signal at the output terminal 57 of the cathode follower stage is fed back by means of lead 58 and resistors 59 and 65 to the output terminal 33 of the gate 15. At the end of the sampling pulse, which has a duration of less than one millimicrosecond, the gate 15 is closed, i.e. rendered non-conductive. At the end of the longer pulses derived from the blocking oscillator 71, the gate 41 is closed and the gate 77 is opened, i.e. rendered conductive. This clamps the output terminal 79 of the A.-C. amplifier 37 to the potential at the output terminal 57 of the cathode follower stage 47.

The gain around the feedback loop is adjusted so that it is the reciprocal of the sampling efficiency. Thus the feedback, which is positive, will raise the level at the output terminal 33 of the sampling gate 15 to the true level of the input signal at the time of the previous sample. Consequently, if the input signal amplitude is the same at the time of the next sample, there is no charge extratced from the input circuit, no signal fed through the A.-C. amplifier 37, and no change in the signal level on the storage capacitor. The effect of this is to make it appear that the sampling efficiency is 100%. Further, as a result of this feedback system the display jumps to the proper value with each sample in spite of the delay introduced by the time constant of the sampling circuit. Thus the apparent rise time does not depend upon the number of samples. Loading of the input circuit is reduced as only changes in the signal voltage charge the input to the oscilloscope. The feedback system tends to reduce input error across the sampling gate 15 since it acts as an integrating servo. Changes in the sampling efficiency of the gate or in the gain of the amplifier and stretcher circuits do not effect the D.-C. sensitivity of the system, but will affect its dynamic response by causing over or undershooting of the displayed waveform.

We claim:

1. A sampling oscilloscope for reproducing high frequency electrical waveforms, said oscilloscope comprising a sampling gate having an input and an output, means to apply the waveform under examination to the input of said sampling gate, a stretcher having an input and an output, said stretcher comprising another gate and a storage device, means including an amplifier to connect the output of said sampling gate to the input of said stretcher, positive feedback means connected between the output of said stretcher and the output of said sampling gate, clamping means including a gate connected between the output of said amplifier and said feedback means, and means to actuate all of said gates.

2. A sampling oscilloscope for reproducing high frequency electrical waveforms, said oscilloscope comprising a sampling gate having an input and an output, means to apply the waveform under examination to the input of said sampling gate, a stretcher having an input and an output, said stretcher comprising another gate and a storage device, means to connect the output of said sampling gate to the input of said stretcher, positive feedback means connected from the output of said stretcher to the output of said sampling gate, means to maintain both said gates normally non-conductive, a sweep circuit, means to derive sampling pulses from said sweep circuit, means to apply said sampling pulses to said sampling gate to render it conductive, means to derive from said sweep circuit other pulses longer than said sampling pulses, and means to apply said other pulses to said other gate to render it conductive.

3. A sampling oscilloscope for reproducing high frequency electrical waveforms, said oscilloscope comprising a sampling gate having an input and an output, means to apply the waveform under examination to the input of said sampling gate, a stretcher having an input and an output, said stretcher comprising another gate and a storage device, means to connect the output of said sampling gate to the input of said stretcher, positive feedback means connected from the output of said stretcher to the output of said sampling gate, means to maintain both said gates normally non-conductive, a sweep circuit, means to derive sampling pulses from said sweep circuit, means to apply said sampling pulses to said sampling gate to render it conductive for the duration of said pulses, means to derive from said sweep circuit other pulses longer than said sampling pulses, and means to apply said other pulses to said other gate to render it conductive for the duration of said other pulses.

4. A sampling oscilloscope for reproducing high frequency electrical waveforms, said oscilloscope comprising a sampling gate having an input and an output, means to apply the waveform under examination to the input of said sampling gate, a stretcher having an input and an output, said stretcher comprising another gate and a storage device, means to connect the output of said sampling gate to the input of said stretcher, positive feedback means connected from the output of said stretcher to the output of said sampling gate, means to maintain both said gates normally non-conductive, a sweep circuit, means to derive sampling pulses from said sweep circuit, means to apply said sampling pulses to said sampling gate to render it conductive for the duration of said pulses, means to derive from said sweep circuit other pulses starting simultaneously with but lasting longer than said sampling pulses, and means to apply said other pulses to said other gate to render it conductive for the duration of said other pulses.

5. A sampling oscilloscope for reproducing high frequency electrical waveforms, said oscilloscope comprising a first gate having an input and an output, means to apply the waveform under examination to the input of said first gate, a stretcher having an input and an output, said stretcher comprising a second gate and a storage device, means including an amplifier to connect the output of said first gate to the input of said stretcher, positive feedback means connected from the output of said stretcher to the output of said first gate, means to maintain said first and second gates normally non-conductive, clamping means including a third gate connected between the output of said amplifier and said feedback means, means to maintain said third gate normally conductive, a sweep circuit, means to derive sampling pulses from said sweep circuit, means to apply said sampling pulses to said first gate to render it conductive, means to derive from said sweep circuit pulses longer than said sampling pulses, and, means to apply said other pulses to said second gate to render it conductive, and to said third gate to render it non-conductive.

6. A sampling oscilloscope for reproducing high frequency electrical waveforms, said oscilloscope comprising a first gate having an input and an output, means to apply the waveform under examination to the input of said first gate, a stretcher having an input and an output, said stretcher comprising a second gate and a storage device, means including an amplifier to connect the output of said first gate to the input of said stretcher, positive feedback means connected from the output of said stretcher to the output of said first gate, means to maintain said first and second gates normally non-conductive, clamping means including a third gate connected between the output of said amplifier and said feed-back means, means to maintain said third gate normally conductive, a sweep circuit, means to derive sampling pulses from said sweep circuit, means to apply said sampling pulses to said first gate to render it conductive for the duration of said pulses, means to derive from said sweep circuit pulses longer than said sampling pulses, and means to apply said other pulses to said second gate to render it conductive for the duration of said other pulses, and to said third gate to render it non-conductive for the duration of said other pulses.

References Cited in the file of this patent

UNITED STATES PATENTS

| 2,661,421 | Talamini et al. | Dec. 1, 1953 |
| 2,669,656 | Meacham | Feb. 16, 1954 |
| 2,715,182 | Bishop | Aug. 9, 1955 |
| 2,721,266 | Stodola | Oct. 18, 1955 |
| 2,735,084 | Adkisson | Feb. 14, 1956 |
| 2,784,906 | Davis | Mar. 12, 1957 |